Patented Feb. 16, 1932

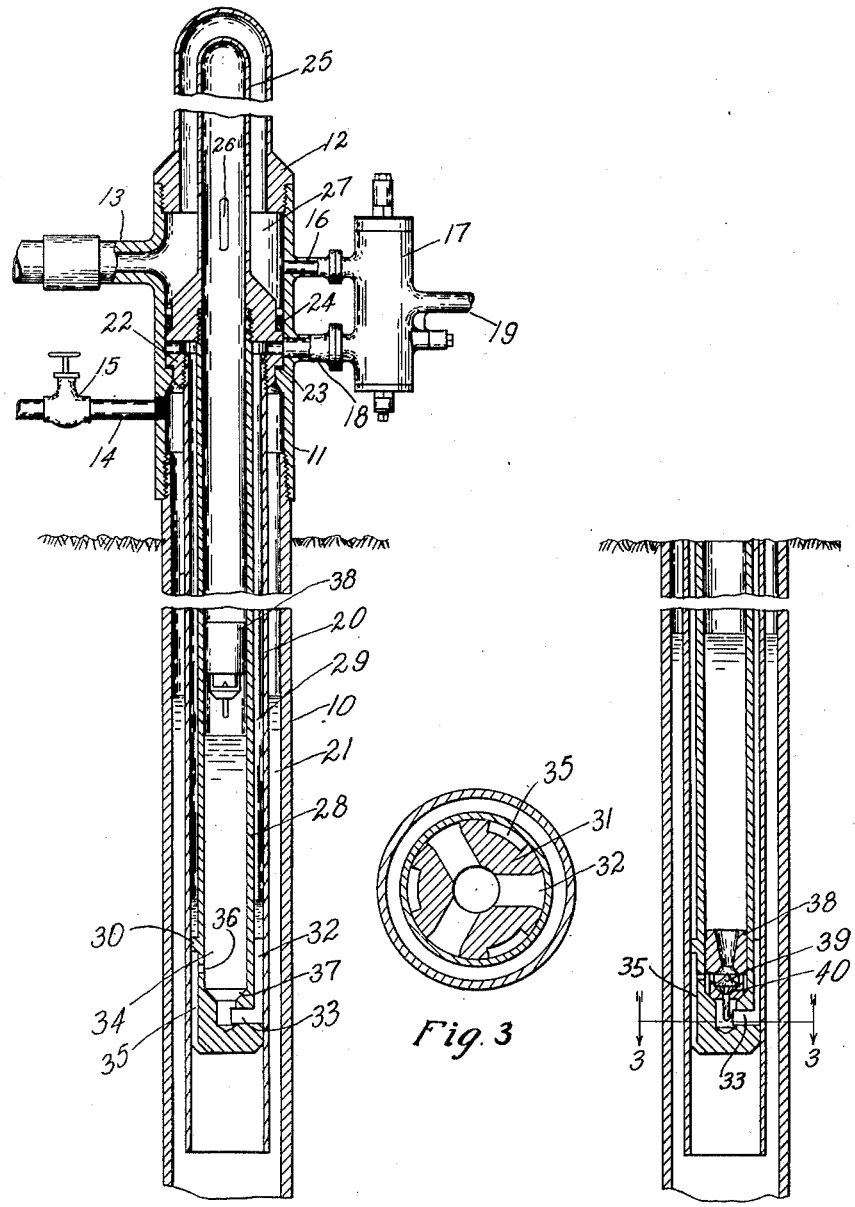

1,846,002

UNITED STATES PATENT OFFICE

HAROLD W. FLETCHER, OF HOUSTON, TEXAS, ASSIGNOR TO HUGHES TOOL COMPANY, OF HOUSTON, TEXAS, A CORPORATION OF TEXAS

MEANS AND METHOD FOR RAISING LIQUID FROM WELLS

Application filed December 15, 1928. Serial No. 326,234.

My invention relates to operations in raising liquid from wells and the invention is particularly adapted for use in operating deep oil wells, where air or other gaseous fluid is employed as the lifting agency.

In operating my apparatus, I contemplate using a plunger below the load of liquid to be discharged in accordance with the invention of my prior application for Patent No. 745,996, filed October 27, 1924.

It is one of the objects of my invention to provide an apparatus whereby a cushion of liquid will at all times be present in the base of the eduction tube to retard the falling plunger.

Another object of my invention is to construct a device wherein the accumulation of a predetermined head of liquid in the well will automatically control the flow of pressure fluid.

I also aim to employ a novel method in raising fluid from wells which is dependent upon relative fluid pressures.

I also desire to supply a device at the lower end of the eduction tube whereby the plunger valve may be maintained in open position until the full supply of pressure fluid is turned on for raising the load and which will permit the valve to be then closed.

I have a further object to so regulate the supply of air to the well that the plunger will not be raised thereby until the desired load of liquid has accumulated above said plunger.

I aim further to provide means whereby the pressure fluid will be automatically admitted to raise the plunger when a predetermined level of liquid in the eduction tube has been reached.

It is to be understood that there are usually several wells in a field to be pumped from one station. Air is supplied to all the wells from one plant at the same pressure. However, some wells may produce only a few barrels a day while others produce several hundred barrels. The heavier producers must be operated much faster than the smaller producers.

It is, therefore, an object of the invention to provide an apparatus which is adaptable to different conditions in different wells so that they may all operate from the same source of supply of the pressure fluid and each of them be individually and automatically controlled to operate in accordance with the conditions in that particular well.

It is another object to provide an effective control device whereby the regulation of the supply of pressure fluid to the well may be accomplished.

Other objects of the invention will be more clearly apparent from the detailed description which follows.

Referring to the drawings herewith:

Fig. 1 is a central longitudinal section through a deep well installation showing the device equipped to carry out my invention.

Fig. 2 is a broken view of the lower end of the eduction apparatus shown with the plunger in position upon its seat at the bottom of the tube.

Fig. 3 is a transverse section on the plane 3—3 of Fig. 2.

Figure 4:
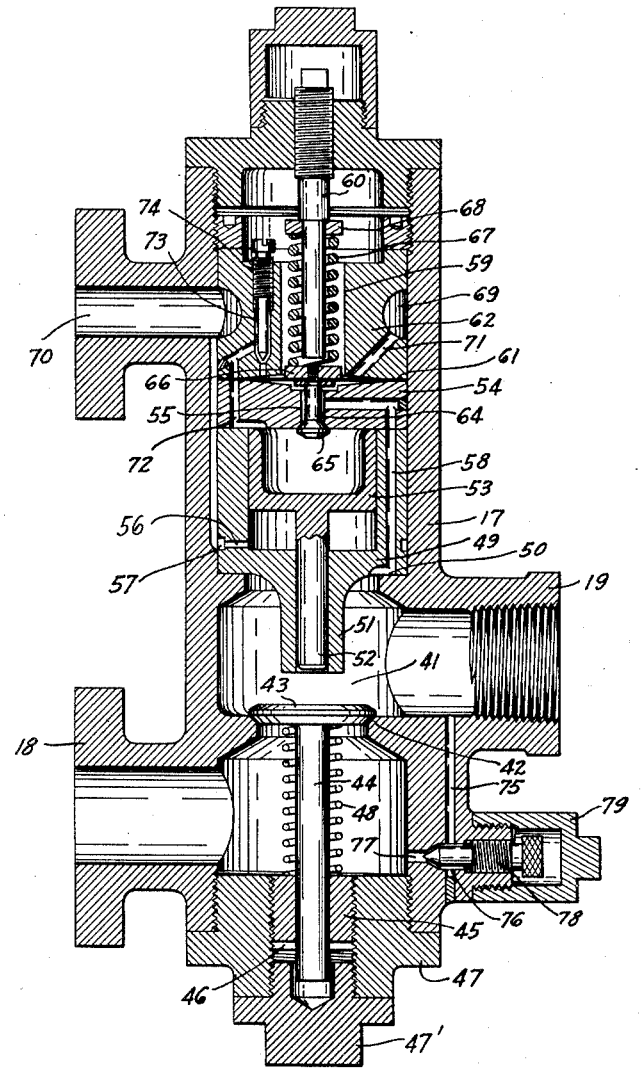
Fig. 4 is a central longitudinal section through the control device which I employ in connection with the air lift apparatus.

In equipping an oil well to carry out my invention, I contemplate that there shall be an outer casing in the well which I represent at 10 in the drawings. This casing is extended down to the desired depth in the well, and my apparatus is installed in connection with this casing. The upper end of the casing projecting above the surface is equipped with a special type of casinghead 11. This head has its upper end closed by means of a nipple or bull plug 12. The body of the casing head has thereon an outlet pipe 13 through which the fluid from the well may be discharged. Below this outlet opening is a second pipe 14 of smaller diameter which serves as an outlet from the casing when desired. A valve 15 in this pipe serves to close this outlet during the ordinary operation of the well.

At one side of the casing head I have connected my regulator through which the pressure fluid—ordinarily air under pressure—is secured. There is an upper pipe 16 connected with the casing 17 of the regulator, and below the pipe 16 is the main inlet pipe 18, through which air under pressure may enter the well.

The pressure fluid enters the regulator through a pipe indicated at 19. The passage through the regulator will be later described in connection with the detailed consideration of the regulator.

The eduction apparatus which I install in the well includes two separate pipes or tubes concentrically spaced within the casing. The outer tube 20 is spaced from the casing to provide a chamber 21 between the two pipes. The lower end is extended into the well so as to be submerged in the liquid of the well to a predetermined distance. The upper end of the pipe 20 is connected within a packing head 22 which fits closely within the casinghead and is supported in the well upon a shoulder 23 in said casinghead. I may provide packing or gaskets about the head, as shown at 24, to make a close seal between the casinghead and the member 22.

The upper end of the packing head 22 is extended into the nipple 12 and has a closed upper end 25 similar in shape to the nipple 12. It has lateral openings 26 at a point below the upper end of the casing head so as to allow an outlet into the chamber 27 in the casinghead.

The inner tube 28 is termed the eduction tube. It is spaced from the pipe 20 to provide a chamber 29 between the two through which the pressure fluid may enter to the lower end of the eduction tube.

The lower end of the tube 28 is formed to fit tightly against the inner walls of the pipe 20. This close fit is extended upwardly from the lower end to the point indicated at 30 in Fig. 1.

With particular reference to Fig. 3, it will be seen that the lower member 31 which fits within the tube 20 has passages 32 cut longitudinally thereof, which, as seen in Fig. 1, branch laterally at 33 to connect with the chamber 34 at the lower end of the tube. There are also upwardly extending slots 35 which stop short of the closure 30 for the lower end of the tubing and have openings 36 connecting with the chamber 34 above the lower end thereof.

Above the inlet 33 to the tube 28 is a downwardly-tapered seat 37 to receive a swab plunger 38 when said plunger is at the lower end of its stroke.

Said plunger fits closely within the eduction tube. It has a central passage therethrough adapted to be closed by an upwardly closing valve 39. Said valve is supported in open position by a yoke or spider 40 below the valve seat. Said yoke may contact with the seat 37 and hold the plunger in position above the inlet ports 36 for the liquid.

The fit of the downwardly extending valve stem with the yoke 40 allows a leakage of air up past the valve when the air pressure is not large. The liquid entering above the valve tends to hold said valve open during the time the head of liquid is accumulating above the plunger. This plunger is similar to the one disclosed in the co-pending application of myself and Norman H. Ricker, Serial No. 313,742, filed October 20, 1928. There is, however, in the present application no seat or means to close the valve upon impact at the lower end of the eduction tube. The seat 37 here shown is adapted to contact with the spider yoke 40 but allows the valve stem to pass into the inlet opening and remain open until conditions about to be described occur.

The regulator or control device 17 is constructed as shown in Fig. 4. The housing includes a valve chamber 41 to which the inlet 19 is connected. The lower end of this chamber has a valve seat 42 in which is positioned the upwardly opening valve 43. Said valve has a stem 44 which projects downwardly to fit within a guide bushing 45 adjustable within a recess 46 in the plug 47 which closes the lower end of the housing. A spring 48 bearing between the valve head 43 and the bushing 45 tends to unseat the valve with a predetermined pressure.

Above the chamber 41 the housing is cylindrical and has therein a specially constructed cylinder member 49 fitting tightly in the housing. It rests upon a shoulder 50 at its lower side. The lower end of the member is closed, except for a downwardly projecting bearing hub 51, which has a bearing opening therein to receive a stem 52 upon the piston 53 therein. The upper end of the cylinder member abuts against a disc-shaped plate 54 which closes the cylinder except for a central valve controlled opening 55.

The piston 53 is hollow and fits the cylinder closely. The stem 52 thereon contacts at its lower end with the head of the valve 43 when the piston is in lowered position. The cylinder has a lower vent 56 connecting with an annular groove 57. The cylinder also has a passage 58 therein connecting the chamber 41 with the opening 55 in the plate 54.

Above plate 54 is a cylindrical block 62 fitting within the housing. It has a vertical opening 59, through which extends a post 60 adjustably anchored at its upper end above the block, in the casing. Between the block and the plate 54 is a thin metal disc or diaphragm 61 and both the block 62 and the plate 54 are recessed or concaved centrally adjacent the diaphragm to allow the bending of the diaphragm under pressure.

Secured centrally of the diaphragm is a pin 64, which extends down from the diaphragm through the opening 55 and has a valve head 65 thereon fitting in a seat at the lower end of the passage. The pin extends through the diaphragm and has a fluid tight fit therethrough. A nut 66 at its upper end serves as a bearing for a spring 67, which fits about the post 60 and is compressed between the nut 66 and a washer 68 on the post. It acts to force the diaphragm and pin 64 downwardly to open the valve 65, with a predetermined pressure. When open, the valve allows communication between the chamber 41 and the cylinder above the piston 53.

The block 62 has a deep circumferential groove 69 therein connecting with the passage 70 from the housing and leading to the inlet 16 from the casing head. A passage 71 allows fluid from the groove 69 to reach the recess above the diaphragm 61.

I provide a vent for the upper end of the cylinder 49 by way of a duct 72 extending upwardly through plate 54 and block 62 to connect with a needle valve chamber 73, the lower end of which leads to the recess above the diaphragm where connection is had with the passages 71 and 69. The needle valve 74 may be adjusted to regulate the size of the vent.

There is a by-pass provided from the pressure fluid supply line 19 past the valve 43 so that a limited leakage of air to the well may occur. This by-pass includes the duct 75 leading from the inlet 19 to a valve chamber 76 and the passage 77. The needle valve 78 is adjustable in the chamber 76 to regulate the leakage as to amount. Said valve 78 may have a projecting cap 79 as shown.

In operating my device the apparatus is assembled as shown in Fig. 1. The plunger 38 is there seen in the act of falling to the bottom and the liquid level in the tube is shown as having risen above the seat 37. The valve is open through gravity and, due to its special construction, will remain open after the plunger has reached its seat. The liquid will continue to flow through passages 32 and ports 36 past the plunger until the proper load has accumulated above the plunger.

In the meantime the valve 43 in the control device is closed through a preponderance of pressure in the line 19 to that below the valve. There will be a leakage gradually through the by-pass 75 to the well. This air under pressure will pass into the space 29 and through passages 33 to the lower end of the eduction tube and as the load of liquid above the plunger is light at first, the air will enter and bubble up through the liquid and escape. Gradually, however, the back pressure due to the accumulating load of liquid above the plunger, will exert sufficient resistance to the entrance of the air so that the air pressure will build up in space 29 and the chamber below valve 43 until the pressure is nearly equal to the line pressure above the valve. When the accumulated pressure below the valve, plus the force of the spring 48, is greater than the line pressure, the valve will be unseated and the said valve 43 will be opened and the piston 53 will be raised.

The opening of the valve 43 will allow full line pressure to be exerted into the space 29 and the valve 39 in the plunger will be forced abruptly into its seat and the plunger and its load will be raised and the liquid will discharge through the openings 26 and the outlet 13.

As the liquid is emptied, the air will finally exhaust through the outlet ports and as the pressure in the eduction tube is relieved the liquid in the space 21 will surge into the eduction tube and partially fill the lower end of the tube before the plunger has fallen back to the bottom. The air will bubble into the liquid and aerate it so that a cushion is thus provided to prevent shock to the plunger as it sinks to its seat. The valve is constructed so that it will remain open by gravity until the sudden force of the full line pressure raises the valve to its seat, said valve being proportionately lighter than the plunger.

The operation of the control device may now be noted. When the load of liquid is forced into the upper end of the eduction tube, the pressure in the upper end of the casing head will be exerted through pipe 16, the passage 70, groove 69, passage 71 and the recess above the diaphragm 61 against said diaphragm to force it downwardly and open valve 65 allowing line pressure to be exerted above piston 53 forcing it downwardly to close valve 43. The pressure of the fluid is assisted in opening valve 65 through the spring 67 as will be obvious. The fluid pressure below the valve 43 will be slightly relieved by the discharge of the same through the eduction tube and when valve 43 is closed it will be held closed by the line pressure from the line 19 as previously explained, until the pressure in the well builds up due to the resistance to the exhaust through the liquid in the eduction tube.

After the discharge of the load of liquid, and the pressure above the diaphragm 61 is thus relieved, the valve 65 will be closed through the pressure below the diaphragm. The pressure fluid above the piston 53 will gradually exhaust through the passage 72 past the needle valve and outwardly to the casing head. This will allow the piston to be moved up through the line pressure on the lower end of the rod 52 of the piston. The time taken to relieve the pressure above the piston 53 may be regulated by adjustment of the needle valve 74.

It is to be understood that by simply removing the plug 47' that the valve 43 may be raised to permit a continual stream of pressure fluid to flow into the well if it is desired to clean out sediment or for other purposes.

It will be noted that this device will operate to discharge liquid from the well only when sufficient liquid has entered the well to justify turning on the air to discharge it; and when the load has accumulated, the air will automatically turn on and the discharge will take place. The operation depends upon the accumulation of a predetermined amount of liquid above the air inlet to the tube at 33. This head may be regulated through the tension of the spring 48 which assists in unseating the valve 43 in the regulator.

Each well receiving pressure fluid from the central station may be regulated to discharge with the desired load, and there will be no wasted effort through the operation of the air lift with an insufficient load.

The use of two tubes within the casing permits the forming of a reservoir in the space 21 which enables me to fill the lower end of the eduction tube quickly after a stroke has been made even where the entrance of liquid to the well is slow. This assures a cushion to the falling plunger which serves to prevent excessive shock and consequent damage to the apparatus.

Having thus described my invention, what I claim as new is:

1. A device for raising liquid from wells including an eduction tube in said well, a freely moving plunger therein, means to conduct gaseous pressure fluid to the lower end of said tube below said plunger, a liquid inlet to said tube and means to admit the full pressure of said fluid to said tube when the liquid has risen to a predetermined height above the lower end of said tube.

2. A device for raising liquid from wells including an eduction tube in said well, a freely moving plunger therein, a valve controlled fluid passage through said plunger, means to conduct gaseous pressure fluid to the lower end of said tube below said plunger, a liquid inlet to said tube and means responsive to the head of liquid in said tube to admit the full pressure of the said gaseous pressure fluid to said tube to raise said plunger.

3. A device for raising liquid from wells including an eduction tube in said well, a freely moving plunger therein, a valve controlled fluid passage through said plunger, means to conduct gaseous pressure fluid to the lower end of said tube below said plunger, a liquid inlet to said tube and means responsive to the liquid pressure in said tube to regulate the admission of pressure fluid to the lower end of said tube.

4. In an air lift device for wells, an eduction tube within the well, a pipe concentric with said tube to conduct pressure fluid to the inlet at the lower end of said tube, a plunger in said tube normally seated therein above the fluid inlet, a valve controlled fluid passage through said plunger, there being a liquid inlet above said fluid inlet, and means to admit the full force of said fluid pressure to said fluid inlet operative in response to the accumulation of a predetermined load of liquid above said inlet.

5. In an air lift device for wells, an eduction tube within the well, a pipe concentric with said tube to conduct pressure fluid to the inlet at the lower end of said tube, a plunger in said tube normally seated therein above the fluid inlet, a liquid inlet to said tube, a valve controlled fluid passage through said plunger, and means to admit the full force of said fluid pressure to said fluid inlet operative in response to the accumulation of a predetermined load of liquid above said inlet.

6. In an air lift device for wells, an eduction tube within the well, a pipe concentric with said tube to conduct pressure fluid to the inlet at the lower end of said tube, a plunger in said tube normally seated therein above the fluid inlet, a valve controlled fluid passage through said plunger, a valve controlling the entrance of said fluid to the well, a liquid inlet to said tube and means to unseat said valve to admit the full fluid pressure to the tube when the liquid has attained a predetermined load above the bottom of said tube.

7. In an air lift device for wells, an eduction tube within the well, a pipe concentric with said tube to conduct pressure fluid to the inlet at the lower end of said tube, a plunger in said tube normally seated therein above the fluid inlet, a valve controlled fluid passage through said plunger, a pressure fluid line connected with said pipe, a valve in said line held normally closed by fluid pressure, a liquid inlet to said tube and means to open said valve when a predetermined load of fluid has accumulated above the plunger and said inlet.

8. In an apparatus of the character described, an eduction tube for liquid in a well, a swab plunger therein, a valve controlled fluid passage through said plunger, a supoprt for said plunger at the bottom of said tube, means to conduct pressure fluid to the lower end of said tube below said plunger, an inlet for liquid from the well to said tube above the fluid inlet, and means to admit pressure fluid to the tube when the desired level of liquid in the eduction tube has been reached.

9. In an apparatus of the character described, an eduction tube for liquid in a well, a swab plunger therein, a valve controlled fluid passage through said plunger, a support for said plunger at the bottom of said tube, means to conduct pressure fluid to the lower end of said tube below said plunger, an inlet for liquid from the well to said tube above the fluid inlet, means to admit pressure fluid to the tube when the desired level of liquid in the eduction tube has been reached, and a valve in said plunger adapted to be closed by said pressure fluid.

10. A device for raising liquid from wells including an eduction tube, a plunger therein, a valve controlled fluid passage through said plunger, means to introduce pressure fluid below said plunger, a pressure line connecting therewith, a valve in said line, a by-pass past said valve from said line for a limited supply of pressure fluid, means to admit liquid to said tube and means to open said valve when said pressure fluid has accumulated to a predetermined value in said tube.

11. A device for raising liquid from wells including an eduction tube, a plunger therein, means to introduce pressure fluid below said plunger, a pressure line connecting therewith, a valve in said line, a by-pass past said valve from said line for a limited supply of pressure fluid, a liquid inlet past said plunger where said plunger is at the lower end of said tube, and means to open said valve when the load of liquid in said tube has reached a predetermined value.

12. In an air lift device for wells, an eduction tube within the well, means to conduct pressure fluid to the lower end of said tube, a plunger in said tube normally seated by gravity therein, a normally open valve in said plunger, a pressure fluid inlet below said valve, a liquid inlet above said valve, and means to admit the full force of the pressure fluid to said inlet to close said valve.

13. A method of raising liquid from wells including accumulating a column of liquid above a plunger, passing air slowly by said plunger upwardly thru said liquid, controlling the flow of air so that it will cease upon a predetermined pressure exerted by the weight of the liquid in the accumulated column, actuating a valve through said pressure to admit a flow of fluid under greater pressure, and raising the plunger and the accumulated column of liquid to the surface.

14. A method of pumping liquid comprising accumulating a column of liquid in a tube above a freely movable plunger, admitting fluid under a low predetermined pressure to the under side of the plunger and allowing it to bubble thru the entrapped column until the pressure of the column exceeds the predetermined pressure, admitting a large flow of fluid below the plunger, and raising the plunger and the accumulated column of liquid.

15. A method of pumping including accumulating a load of liquid to be raised, using the weight of such load to admit fluid pressure to raise the load, and using the pressure accumulated by such raising to stop the flow of fluid pressure.

16. A method of raising liquid from wells by fluid pressure, including using the pressure of the accumulating load of liquid to admit a flow of pressure fluid, raising the column of liquid, and using the discharge of the liquid to cut off the flow of pressure fluid.

17. In a well pumping apparatus, a casing head, a plug to close the upper end thereof, means within said casing head whereby a closed chamber is formed thereabove, and a tube carried by and projecting above said means and having outlets to said chamber.

18. In a well pumping apparatus, a well casing, a plurality of concentric tubes therein, a casing head on said casing, a bull plug closing the upper end thereof, a lateral fluid outlet in said casing head below said bull plug, a plunger movable from the lower end to the upper end of the innermost of said pipes, said pipe having an outlet to said casing head, the space between said pipes providing an entrance for pressure fluid to said innermost pipe.

19. A well casing, a casing head thereon, means to close the upper end of said casing head, a packing head closing the lower end of said casing head, an eduction tube supported by said packing head, a discharge nipple on said packing head connected with said eduction tube and allowing discharge of liquid to said casing head, the space between said pipes providing an entrance for pressure fluid to said innermost pipe.

20. In a well pumping device, a casing, a concentric pipe therein, an eduction tube in said pipe, a block on the lower end of said tube fitting closely against the inner periphery of said pipe, a plunger seat in said tube centrally of said block, a liquid inlet above said seat, a pressure fluid inlet below said seat, and a plunger working in said tube, the space between said pipes providing an entrance for pressure fluid to said innermost pipe.

In testimony whereof I hereunto affix my signature this 30th day of November, A. D. 1928.

HAROLD W. FLETCHER.